US008972470B2

(12) United States Patent
Park et al.

(10) Patent No.: US 8,972,470 B2
(45) Date of Patent: Mar. 3, 2015

(54) METHOD OF GENERATING RANDOM NUMBER USING NONVOLATILE MEMORY IN TWO-TRACK SCHEME AND APPARATUS FOR THE SAME

(75) Inventors: Dae-Seon Park, Daejeon (KR); In-Seok Kang, Daejeon (KR); Haeng-Seok Ko, Daejeon (KR); Byeong-Ho Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 256 days.

(21) Appl. No.: 13/595,186

(22) Filed: Aug. 27, 2012

(65) Prior Publication Data

US 2013/0282781 A1    Oct. 24, 2013

(30) Foreign Application Priority Data

Apr. 23, 2012  (KR) .................. 10-2012-0042315

(51) Int. Cl.
*G06F 1/02*           (2006.01)

(52) U.S. Cl.
USPC ........................................................ 708/250

(58) Field of Classification Search
CPC ........... G06F 7/58; G06F 7/588; G06F 7/584; G06F 7/582; H03K 3/84
USPC .............................................. 708/250–256
See application file for complete search history.

(56) References Cited

U.S. PATENT DOCUMENTS

| | | | |
|---|---|---|---|
| 5,707,286 A * | 1/1998 | Carlson ........................... 463/16 |
| 7,034,654 B2 * | 4/2006 | Forest et al. ................. 340/5.26 |
| 7,496,616 B2 * | 2/2009 | Chari et al. .................... 708/250 |
| 8,130,955 B2 * | 3/2012 | Trichina et al. ............... 380/268 |
| 8,560,587 B2 * | 10/2013 | Schneider ..................... 708/250 |
| 2004/0267847 A1 * | 12/2004 | Harper .......................... 708/250 |
| 2007/0143384 A1 * | 6/2007 | Muranaka ..................... 708/250 |
| 2007/0176744 A1 | 8/2007 | Park et al. |
| 2009/0049111 A1 * | 2/2009 | Chari et al. .................... 708/254 |
| 2009/0165086 A1 * | 6/2009 | Trichina et al. .................... 726/2 |
| 2010/0070549 A1 * | 3/2010 | Nagaraj ........................ 708/254 |
| 2011/0075840 A1 | 3/2011 | Zayas et al. |
| 2012/0276974 A1 * | 11/2012 | Nilsson et al. .................. 463/16 |
| 2013/0060708 A1 * | 3/2013 | Oskolkov et al. ............... 705/75 |

FOREIGN PATENT DOCUMENTS

| | | |
|---|---|---|
| EP | 1758020 A1 | 2/2007 |
| JP | 2011-076590 A | 4/2011 |
| KR | 10-2004-0104854 A | 12/2004 |
| KR | 10-2007-0018986 A | 2/2007 |
| KR | 10-2009-0048014 A | 5/2009 |
| WO | 2008/131444 A2 | 10/2008 |

* cited by examiner

*Primary Examiner* — Tan V. Mai
(74) *Attorney, Agent, or Firm* — LRK Patent Law Firm

(57) ABSTRACT

A method of generating a random number using nonvolatile memory and an apparatus for the same are provided. The method of generating a random number includes reading random number state information from nonvolatile memory when power is supplied; updating the random number state of a random number generator using the random number state information and a saving entropy source, thereby producing updated random number state information; storing the updated random number state information in the nonvolatile memory; updating a random number state of the random number generator using the updated random number state information and a generating entropy source, thereby producing a generating random number state information; and producing a random number to be used in an application program using the generating random number state information and the generating entropy source.

9 Claims, 4 Drawing Sheets

METHOD OF GENERATING RANDOM NUMBER USING NONVOLATILE MEMORY IN TWO-TRACK SCHEME AND APPARATUS FOR THE SAME

CROSS-REFERENCE(S) TO RELATED APPLICATIONS

This application claims priority to Korean Patent Application No. 10-2012-0042315 filed on Apr. 23, 2012, which is incorporated herein by reference in its entirety.

BACKGROUND OF THE INVENTION

1. Field of the Invention

Exemplary embodiments of the present invention relate to a technique for generating a random number; and, particularly, to a method of generating a random number using nonvolatile memory in a two-track scheme and an apparatus for the same.

2. Description of Related Art

A random number generator provides a random number to be used in application programs such as certification or encryption using an algorithm for generating a random number. Specifically, a random number generated by a random number generator imparts security and integrity to application programs.

Random number generators may be broadly classified into hardware random number generators and software random number generators. Generally, hardware random number generators have the advantage of high speed compared to software random number generators, but, however, have the disadvantages of high cost and time required for the development thereof. On the other hand, software random number generators have the advantages of low cost and short time for development, but conversely have the disadvantage of low generation speed compared to hardware random number generators.

Despite these shortcomings, the software random number generator has been recently used in various fields, and active research is being conducted thereon.

Embedded systems having software random number generators are broadly classified into SRAM (Static Random Access Memory)-based products and flash memory-based products, with SRAM-based products occupying the greatest market share.

The random number generator is inputted with an internal state (or seed) constructed using various entropy sources, and updates the internal state to generate a random number that is unpredictable. The SRAM-based random number generator has a volatile characteristic, and so information about its state, which is stored in memory, disappears when the power supply is cut off. Accordingly, in order to store state information, the existing SRAM-based random number generator has an external backup battery so that information about the state of the generator can be continuously stored to SRAM, regardless of whether power is being supplied.

FIG. 1 is a block diagram showing an embedded system including a SRAM-based random number generator according to the related art.

With respect to FIG. 1, information about the state of a random number generator is stored in SRAM 102, and when power is supplied through an external power source 101, a microprocessor 107 loads information about the state of the random number generator stored in SRAM 102 to send it to SDRAM 106, where the process of generating a random number is performed. As an algorithm for generating a random number, a standard HASH algorithm such as SHA-256 or the like can be used.

In a nonvolatile memory 108, a program for booting an embedded system, a device control program and an initialization program are stored. The information (program) stored in the nonvolatile memory is not deleted, even when the supply of power is cut off.

Accordingly, if nonvolatile memory is used in place of SRAM, it can prevent problems from occurring when the supply of power is cut off, but there is other problem in that the nonvolatile memory has limitation on number of writing and no limitation on the number of reading.

A backup battery 104 provides power necessary for operation of the SRAM 102 through a power switching circuit 103 when an external power source 101 is cut off.

The external power source 101 provides power for system operation.

The power switching circuit 103 performs switching by comparing the voltage level of the external power source 101 with that of the backup battery 104. For example, the power switching circuit 103 maintains the supply of power from the internal backup battery 104 to the SRAM 102 when the external power source 101 is off.

The backup battery 104 provides power to the SRAM 102 when the external power source 101 is cut off, and provides power for operating the RTC (Real Time Clock) 105.

The RTC 105 provides time information for use as an entropy source when generating a random number. The value generated in the RTC 105 is used as a seed for the random number generator.

As described above, embedded systems including the existing random number generator use SRAM, and so there are many problems that a circuit for supplying power from a battery is necessary in case external power is cut off, and the lifetime of the battery affects the lifetime of the entire embedded system.

Accordingly, a new technique capable of generating random number more effectively in an embedded system is seriously needed.

SUMMARY OF THE INVENTION

An object of the present invention is to realize miniaturization and high efficiency of an embedded system including an existing SRAM-based random number generator, by using a nonvolatile memory without a separate construction for the embedded system.

Another object of the present invention is to prevent the same random number from being repeatedly generated when a random number is generated using nonvolatile memory.

Another object of the present invention is to minimize the number of steps for re-storing random number state information in a nonvolatile memory and to generate an unpredictable random number using a two-track scheme, in which a process for updating random number state information to be saved is separate from a process for updating generating random number state information.

An embodiment of the present invention is directed to a method of generating a random number using nonvolatile memory, including: reading random number state information from the nonvolatile memory when power is supplied; updating a random number state of a random number generator using the random number state information and a saving entropy source, thereby producing updated random number state information; storing the updated random number state information in the nonvolatile memory; updating the random number state of the random number generator using the updated random number state information and a generating entropy source, thereby producing generating random number state information; and producing a random number to be used in an application program using the generating random number state information and the generating entropy source.

In the embodiment, the generating entropy source may be different from the saving entropy source, and so the generating of the updated random number state information and the generating of the generating random number state information may be performed independently.

In the embodiment, the storing operation in the nonvolatile memory may be performed only once when the power is supplied, and the operation of producing the random number may be performed repetitively while continuously updating the random number state during the supply of power.

In the embodiment, the saving entropy source may includes at least one of an RTC time value, system-specific information saving initialization information and a first other entropy source.

The generating entropy source may includes at least one of the RTC time value, the system-specific information, generating initialization information and a second other entropy source.

Another embodiment of the present invention is directed to a random number generator, including: a nonvolatile memory for storing random number state information; a SDRAM for storing execution codes of the random number generator; and a microprocessor for controlling the random number generator to update a random number state using a saving entropy source and a generating entropy source.

Wherein the microprocessor reads the random number state information from the nonvolatile memory when power is supplied, and updates the random number state of the random number generator using the random number state information and the saving entropy source to produce updated random number state information, and stores the updated random number state information in the nonvolatile memory.

In the embodiment, the microprocessor may update the random number state of the random number generator using the updated random number state information and a generating entropy source and may produce a generating random number state information, and the microprocessor may produce a random number to be used in an application program using the generating random number state information and the generating entropy source.

In the embodiment, the generating entropy source may be different from the saving entropy source, and so the updated random number state information and the generating random number state information may be produced independently.

In the embodiment, the updated random number state information may be stored in the nonvolatile memory only once when the power is supplied, and the random number to be used in the application program may be produced repetitively by continuously updating the random number state during the supply of power.

The present invention uses a two-track scheme for separating an update process for a random number state to be saved and an update process for a random number state for execution, and is capable of generating an unpredictable random number in embedded system using a nonvolatile memory.

In addition, the present invention prevents the random number state information from being restored in nonvolatile memory, overcomes the limitation on the number of times that nonvolatile memory can be written to, and can produce an unpredictable random number.

DESCRIPTION OF SPECIFIC EMBODIMENTS

Exemplary embodiments of the present invention will be described below in more detail with reference to the accompanying drawings. In the following description of the present invention, repeated explanations and detailed descriptions of known functions and configurations will be omitted when they may make the subject matter of the present invention rather unclear. Rather, these embodiments are provided so that this disclosure will be thorough and complete, and will fully convey the scope of the present invention to those skilled in the art. Accordingly, shapes and sizes of the elements in drawings may be exaggerated for more clear explanation.

Hereinafter, an exemplary embodiment according to the present invention will be described in detail with reference to the accompanying drawings.

Figure 1:
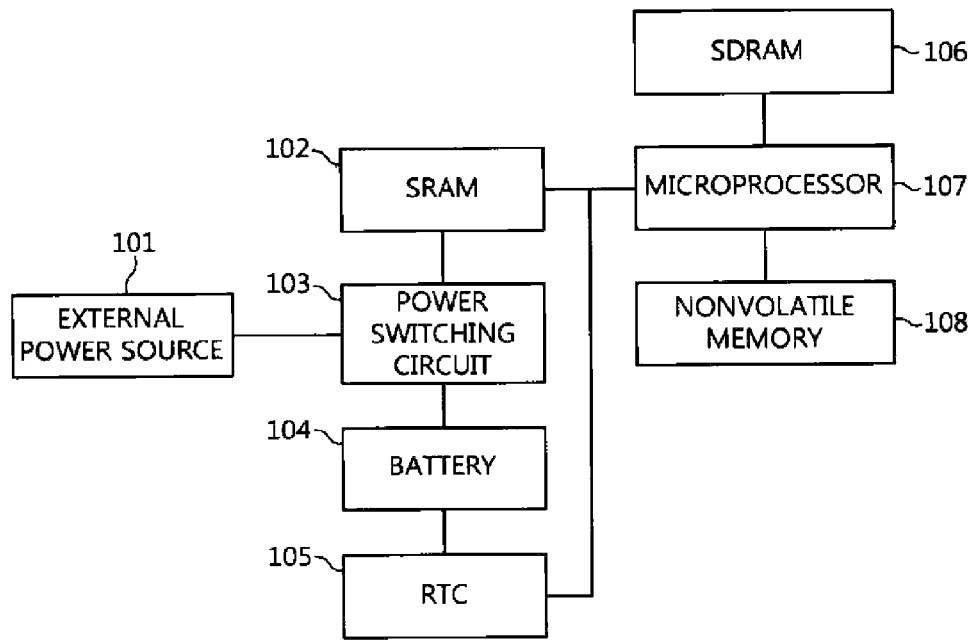
FIG. 1 is a block diagram showing a SRAM based random number generator according to a related art.
Figure 2:
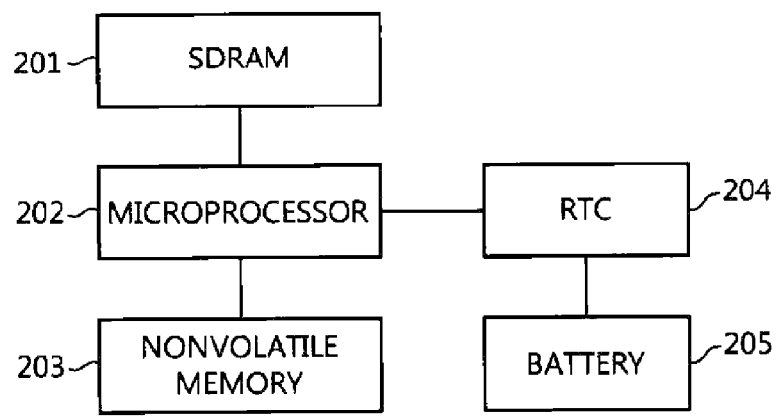
FIG. 2 is a block diagram showing a random number generator using nonvolatile memory according to an embodiment of the present invention.

FIG. 2 is a block diagram showing a random number generator using nonvolatile memory according to an embodiment of the present invention.

In FIG. 2, the random number generator using nonvolatile memory according to an embodiment of the present invention comprises SDRAM 201, microprocessor 202, nonvolatile memory 203, RTC 204, and a battery 205.

The SDRAM 201 is an execution memory space and stores a random number generation algorithm in software so as to generate a random number in the random number generator of FIG. 2 and update its internal state.

Execution codes stored in the SDRAM 201 perform a function of generating a random number, and one of many existing methods can be used as the method for generating a random number. The random number generation algorithm stored in the SDRAM 201 may correspond to a random number generator embodied in software.

The SDRAM 201 is space from which all stored information is deleted when the power supply is cut off. So, the random number state information of the random number generator is safely stored in the nonvolatile memory 203.

The SDRAM 201 provides a means that is capable of executing an algorithm for updating the internal state of the random number generator in the microprocessor 202.

The microprocessor 202 reads information about the internal state of the random number generator (random number state information) that is stored in the nonvolatile memory 203, and provides values provided from the RTC 204 at the time of initialization of the random number generator, initialization information, system-specific information and any other available input entropy source, to execution codes of the random number generator that is stored in the SDRAM 201 so as to generate a random number.

The microprocessor 202 again stores updated information about the internal state of the random number generator (random number state information) in nonvolatile memory, after initializing the random number generator using the information provided. Subsequently, when a request from an application program is received, or when an application program is in an idle state, the internal state (random number state) of the random number generator is continuously updated.

The microprocessor 202 controls the update of the random number state of the random number generator using the saving entropy source and the generating entropy source.

The microprocessor 202 reads the random umber state information from the nonvolatile memory 203 when power is supplied, and updates the random number state of the random number generator using the random number state information and the saving entropy source to generate the updated random number state information, and stores the updated random number state information in the nonvolatile memory 203.

The microprocessor 202 updates the random number state of the random number generator using the updated random number state information and the generating entropy source to generate the generating random number state information, and generates a random number to be used in an application program using the generating random number state information and the generating entropy source.

The generating entropy source is different from the saving entropy source, and so the updated random number state information and the generating random number state information may be generated independently.

The updated random number state information is stored in the nonvolatile memory 203 only once when power is supplied, and the random number to be used in application program may be repetitively generated by continuously updating the random number state while the power supply is on.

The saving entropy source may include at least one of an RTC time value, system-specific information, saving initialization information and the first other entropy source.

The generating entropy source may include at least one of an RTC time value, system-specific information, generating initialization information and the second other entropy source.

The nonvolatile memory 203 stores the initial random number state information of the random number generator, and re-stores the random number state information, which is updated in the course of initialization when the random number generator is initialized.

In addition, the nonvolatile memory 203 is an exclusive memory space for storing information about the boot program of an embedded system. With respect to the boot program in the nonvolatile memory 203, only a reading operation is performed. Reading and writing can be performed for the random number state information when it is updated after the power is supplied. The random number state information is not stored again after the initialization of the random number generator is completed.

Accordingly, this invention can minimize the number of times that the random number state information is updated and re-stored in the nonvolatile memory 203, thereby increasing the lifetime of the nonvolatile memory and the lifetime of the embedded system.

The RTC 204 is provided with power from an internal backup battery 205 regardless of the supply of power, and provides a time value of the system, which are necessary for the random number generation or the initialization of the random number generator, by the control of the microprocessor 202.

Figure 3:
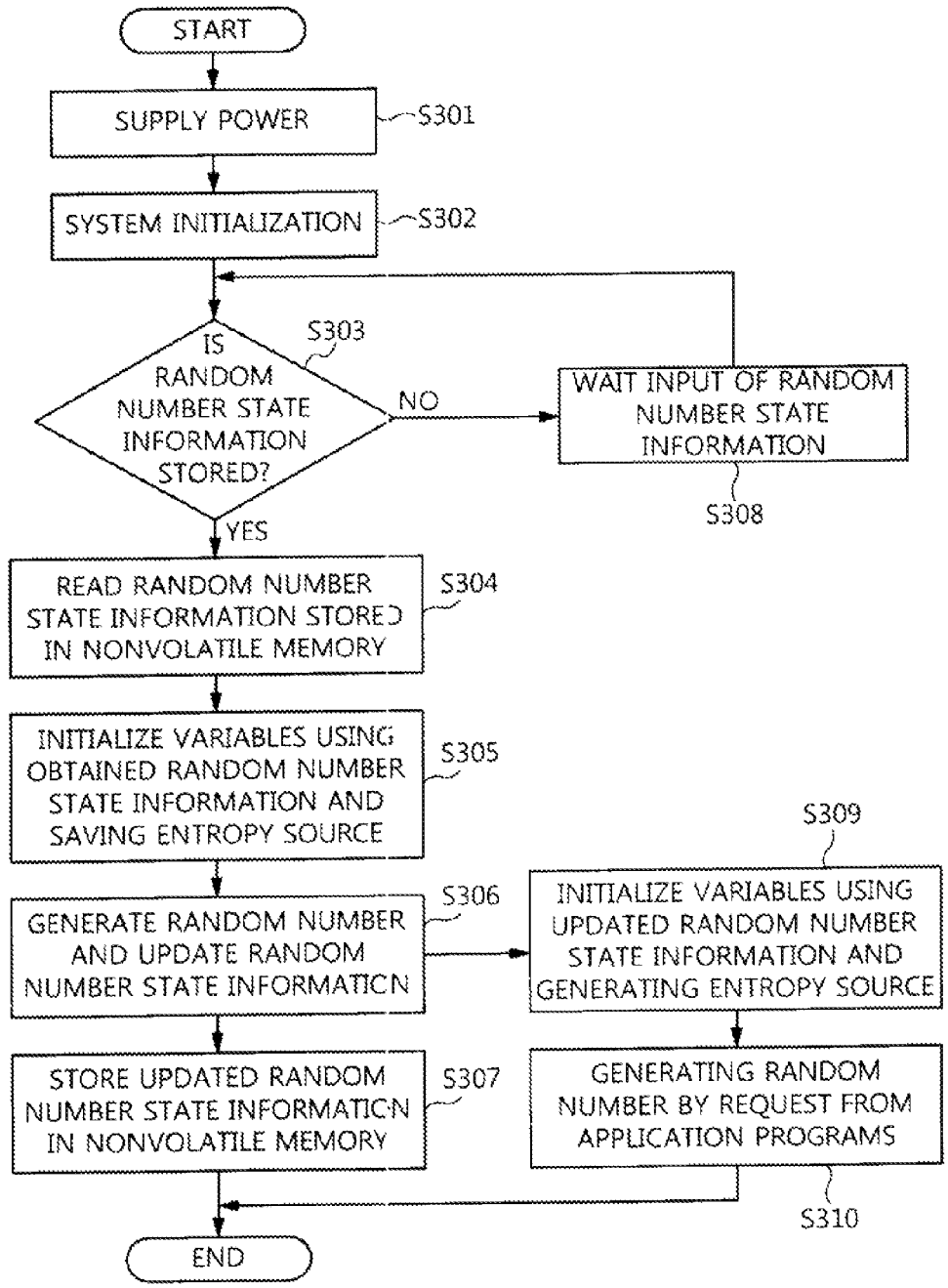
FIG. 3 is a flow chart showing the random number generation method according to an embodiment of the present invention.

FIG. 3 is a flow chart showing the random number generation method according to an embodiment of the present invention.

With respect to FIG. 3, in the random number generation method according to the embodiment of the present invention, power is supplied to the random number generator (S301).

In addition, in the random number generation method according to the embodiment of the present invention, the system is initialized when power is supplied to the random number generator (S302).

In addition, in the random number generation method according to the embodiment of the present invention, whether or not random number state information is stored is determined when power is supplied to the random number generator (S303).

If, according to the result of the determination at step S303, it is determined that random number state information is not stored, this random number generation method according to the embodiment of the present invention stands by input of random number state information (S308).

If, according to the result of the determination at step S303, it is determined that random number state information is stored, this random number generation method according to the embodiment of present invention reads random number state information stored in the nonvolatile memory (S304).

In addition, in the random number generation method according to this embodiment of the present invention, variables are initialized using the obtained random number state information and the saving entropy source (S305).

The saving entropy source may include at least one of an RTC time value, system-specific information, saving initialization information and the first other entropy source.

Variables may be at least one of random number state information, an RTC time value, system-specific information, saving initialization information and other input entropy source.

In this random number generation method according to the embodiment of the present invention, the random number state of the random number generator is updated using the initialized variables to produce updated random number state information (S306).

Step S306 can be performed by generating a random number.

When random number state information is updated at step S306, in the random number generation method according to the embodiment of the present invention, the updated random number state information is stored in nonvolatile memory (S307).

Step S307 may be performed only once, when power is supplied.

Meanwhile, when random number state information is updated at step S306, in the random number generation method according to the embodiment of the present invention, variables are initialized using the updated random number state information and the generating entropy source (S309).

The generating entropy source is different from the saving entropy source, and so steps S305 and S306 may be performed independently of steps S309 and S310.

The generating entropy source may include at least one of an RTC time value, system-specific information, generating initialization information and a second other entropy source.

The variables may be any at least one of random number state information, an RTC time information, system-specific information, generating initialization information and other input entropy source. Here, the variables may include generating random number state information.

In addition, in the random number generation method according to the embodiment of the present invention, the random number to be used in an application is produced using the initialized variables (S310).

Step S310 in FIG. 3 may be performed repetitively for every random number generation operation while power is supplied. In other words, step S307 is performed only once when power is supplied, and step S310 may be repetitively performed with continuous updating of the random number state during power is supplied.

As shown in FIG. 3, in the method of generating a random number according to the embodiment of the present invention, after updating the internal state (random number state) of the random number generator, the updated random number state is stored in the nonvolatile memory, and the random number state information, which is necessary for producing a random number for an application program, is updated using the random number state information to be saved and a separately inputted generating entropy source. The updated random number state, which is necessary for producing a random number, is updated continuously at the request from an application program, or during the idle state of an application program.

Figure 4:
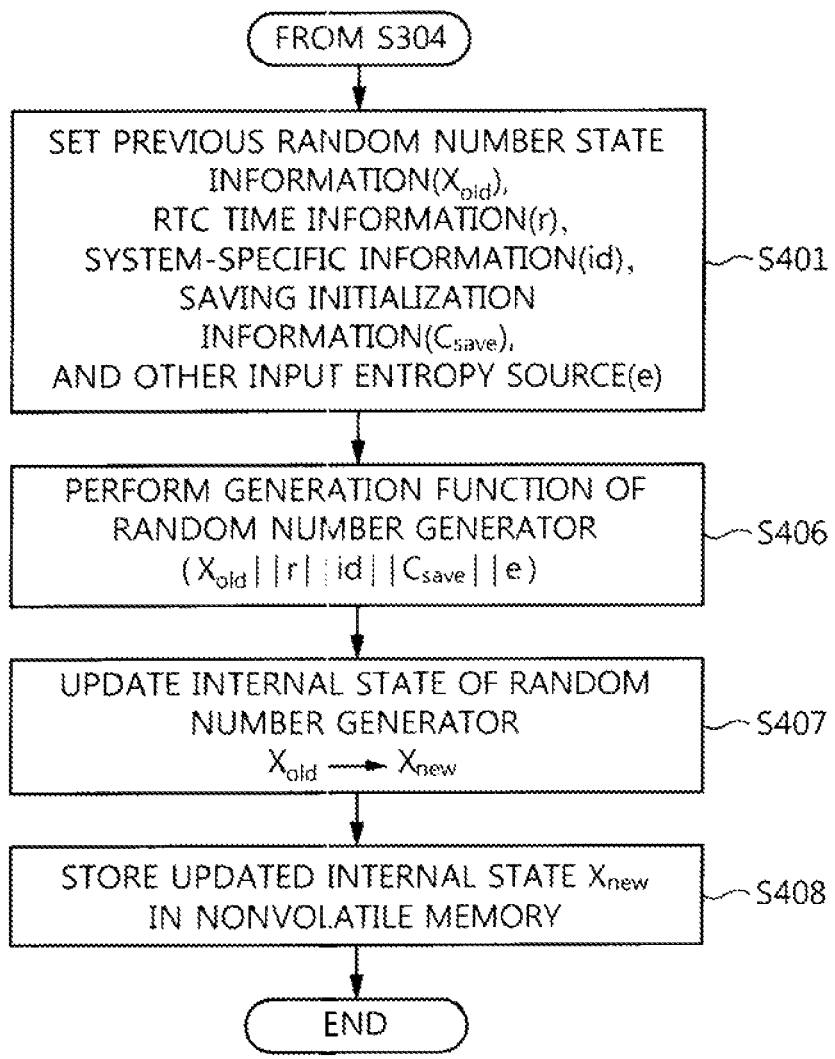
FIG. 4 is a flow chart showing, in detail, variable initialization using the saving entropy source in FIG. 3, the update of random number state information and a step of storing information in nonvolatile memory.

FIG. 4 is a flow chart showing in detail variable initialization using the saving entropy source in FIG. 3, the update of random number state information, and the step of storing information in nonvolatile memory.

With respect to FIG. 4, the initialization of variables is first performed (S401).

Here, the variables may be previous random number state information $X_{old}$, RTC time information r, system-specific information id, saving initialization information $C_{save}$, and other input entropy source e.

In other words, at step S401, in order to update the internal state with unpredictable new values, the random number generator is inputted with internal state ($X_{old}$=$SEED_{init}$) information (random number state information) of a previous random number generator, RTC time information r, obtained from an RTC powered by a backup battery, system-specific information id, separate initialization information (saving initialization information) $C_{save}$ for updating information about the state of the random number generator to be saved, and other input entropy source e, and then uses them as input variables for the random number generation function.

A random number generation function is executed using the initialized variables as input variables (S406).

For example, a random number generation algorithm can be expressed as following Equation 1.

$$X_{new}=RNG(X_{old}\|r\|id\|C_{save}\|e) \qquad \text{<Equation 1>}$$

Here, $X_{new}$ denotes updated random number state information.

In addition, the microprocessor updates the internal state of the random number generator in SDRAM using the initialized variables (S407).

The updated internal information about the state of the random number generator (updated random number state information) is re-stored in the nonvolatile memory (S408).

Step S401 in FIG. 4 corresponds to step S305 in FIG. 3, steps S406 and S407 in FIG. 4 correspond to step S306 in FIG. 3, and stop S408 in FIG. 4 corresponds to step S307 in FIG. 3.

Figure 5:
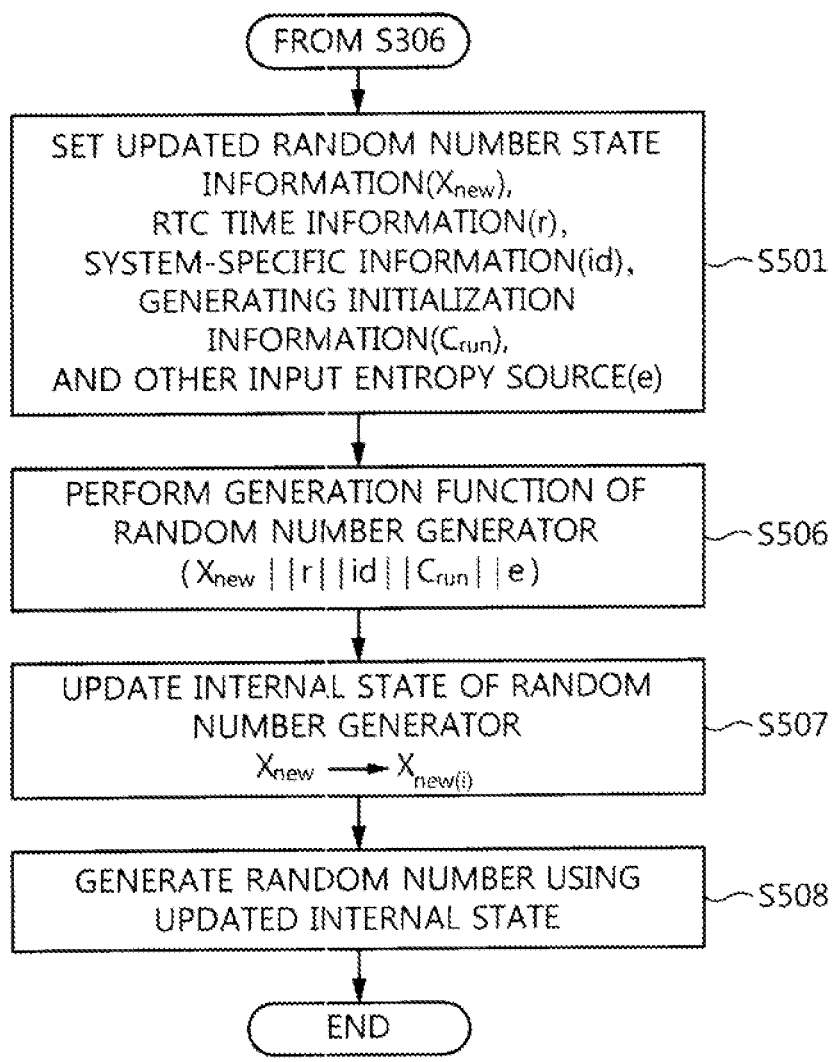
FIG. 5 is a flow chart showing in detail variable initialization using the generating entropy source in FIG. 3, and a step of producing a random number.

FIG. 5 is a flow chart showing in detail variable initialization using a generating entropy source in FIG. 3 and a step of producing a random number.

With respect to FIG. 5, the initialization of variables is first performed (S501).

Here, the variables may be updated random number state information $X_{new}$, RTC time information r, system-specific information id, generating initialization information $C_{run}$, and other input entropy source e.

In other words, at step S501, so as to produce a random number, which is necessary for certification and encryption, the random number generator is inputted with updated random number state information $X_{new}$, RTC time information r at random number generation timing obtained from an RTC powered by a backup battery, a system-specific information id, separate initialization information (generating initialization information) $C_{run}$ for updating information about the state of the random number generator for execution, and other input entropy source e, and then uses them as input variables for the random number generation function.

A random number generation function is executed using the initialized variables as input variables (S506).

For example, a random number generation algorithm can be expressed using the following Equation 2.

$$\text{Random Number}=RNG(X_{new}\|r\|id\|C_{run}\|e) \qquad \text{<Equation 2>}$$

Equation 2 corresponds to producing random number necessary for certification and encryption in an application program, and corresponds to updating the internal state of the random number generator ($X_{new} \rightarrow X_{new(i)}$) In other words, the microprocessor updates, using initialized variables, the internal state of the random number generator in SDRAM (S507), and subsequently produces the random number continuously to simultaneously update the internal state (S508).

Step S501 in FIG. 5 corresponds to step S309 in FIG. 3, and steps S506, S507 and S508 in FIG. 5 may correspond to step S310 in FIG. 3

As described above, the random number generator and the method of generating a random number according to the present invention minimize the number of repeated storage operations in the nonvolatile memory, using a two-track scheme, which performs the steps in FIG. 4 and the steps in FIG. 5 independently, and are capable of providing an unpredictable random number.

While the present invention has been described with respect to the specific embodiments, it will be apparent to those skilled in the art that various changes and modifications may be made without departing from the spirit and scope of the invention as defined in the following claims.

What is claimed is:

1. A method of generating a random number using a nonvolatile memory, comprising:
   reading random number state information from the nonvolatile memory when power is supplied;
   updating a random number state of a random number generator using the random number state information and a saving entropy source, thereby producing updated random number state information;
   storing the updated random number state information in the nonvolatile memory;
   updating the random number state of the random number generator using the updated random number state information and a generating entropy source, thereby producing generating random number state information; and
   producing a random number to be used in an application program using the generating random number state information and the generating entropy source, wherein the generating entropy source is different from the saving entropy source, and so the generating of the updated random number state information and the generating of the generating random number state information are performed independently.

2. The method of claim 1, wherein the storing operation in the nonvolatile memory is performed only once when the power is supplied, and the producing the random number is performed repetitively while continuously updating the random number state during a supply of power.

3. The method of claim 2, wherein the saving entropy source comprises at least one of an RTC time value, system-specific information, saving initialization information and a first entropy source.

4. The method of claim 3, wherein the generating entropy source comprises at least one of the RTC time value, the system-specific information, generating initialization information and a second entropy source.

5. A random number generator comprising:
a nonvolatile memory for storing random number state information;
a SDRAM for storing execution codes of the random number generator; and
a microprocessor for controlling the random number generator to update a random number state using a saving entropy source and a generating entropy source;
wherein the microprocessor reads the random number state information from the nonvolatile memory when power is supplied, and updates the random number state of the random number generator using the random number state information and the saving entropy source to produce updated random number state information, and stores the updated random number state information in the nonvolatile memory;
wherein the microprocessor updates the random number state of the random number generator using the updated random number state information and a generating entropy source, and produces a generating random number state information; and
the microprocessor produces a random number to be used in an application program using the generating random number state information and the generating entropy source.

6. The apparatus of claim 5, wherein the generating entropy source is different from the saving entropy source, and so the updated random number state information and the generating random number state information are produced independently.

7. The apparatus of claim 6, wherein the updated random number state information is stored in the nonvolatile memory only once when the power is supplied, and the random number to be used in the application program is produced repetitively by continuously updating the random number state during a supply of power.

8. The apparatus of claim 7, wherein the saving entropy source comprises at least one of an RTC time value, system-specific information, saving initialization information and a first entropy source.

9. The apparatus of claim 8, wherein the generating entropy source comprises at least one of the RTC time value, the system-specific information, generating initialization information and a second entropy source.

* * * * *